United States Patent
Borane et al.

(10) Patent No.: US 12,144,356 B2
(45) Date of Patent: Nov. 19, 2024

(54) INSECTICIDAL COMPOSITIONS

(71) Applicants: UPL do Brasil Industria e Comercio de Insumos Agropecuarios S.A, Ituverava (BR); UPL Corporation Limited

(72) Inventors: Mahesh Dharma Borane, Mumbai (IN); Ritesh Pagare, Mumbai (IN); Luiz Campos, Ituverava (BR)

(73) Assignees: UPL DO BRASIL INDUSTRIA E COMERCIO DE INSUMOS AGROPECUARIOS S.A., Ituverava (BR); UPL CORPORATION LIMITED, Port Louis (MU)

( * ) Notice: Subject to any disclaimer, the term of this patent is extended or adjusted under 35 U.S.C. 154(b) by 0 days.

(21) Appl. No.: 17/902,354

(22) Filed: Sep. 2, 2022

(65) Prior Publication Data
US 2023/0078970 A1     Mar. 16, 2023

(51) Int. Cl.
| | |
|---|---|
| *A01P 7/04* | (2006.01) |
| *A01N 33/08* | (2006.01) |
| *A01N 53/00* | (2006.01) |
| *A01N 57/10* | (2006.01) |
| *A01N 57/28* | (2006.01) |
| *A01N 65/12* | (2009.01) |

(52) U.S. Cl.
CPC ............ *A01N 65/12* (2013.01); *A01N 33/08* (2013.01); *A01N 57/10* (2013.01); *A01P 7/04* (2021.08)

(58) Field of Classification Search
CPC combination set(s) only.
See application file for complete search history.

(56) References Cited

U.S. PATENT DOCUMENTS

| | | | | |
|---|---|---|---|---|
| 2007/0293550 A1* | 12/2007 | Rochling | ............... | A01N 47/36 514/384 |
| 2009/0208423 A1 | 8/2009 | Jadhav et al. | | |
| 2010/0016163 A1* | 1/2010 | Keiper | .................. | A01N 25/30 514/525 |

FOREIGN PATENT DOCUMENTS

| | | | |
|---|---|---|---|
| IN | 1709MU2010 A | | 2/2013 |
| WO | WO 2005/039288 | * | 5/2005 |
| WO | 2015142609 A1 | | 9/2015 |
| WO | 2018215883 A1 | | 11/2018 |

OTHER PUBLICATIONS

Hallcomid® M-8-10 Product Bulletin, Stepan Co., pp. 1-2 (2017).*
Chen, J., "Stepan Company: Green solvents for a more sustainable agriculture," Agropages, Jun. 9, 2021, retrieved from the internet:<https://news.agropages.com/News/NewsDetail---39381.htm>.*

* cited by examiner

*Primary Examiner* — John Pak
(74) *Attorney, Agent, or Firm* — CANTOR COLBURN LLP

(57) ABSTRACT

Insecticidal compositions include a combination of at least one pyrethroid insecticide, at least one additional insecticide, at least one N,N-dialkyl-$C_8$-$C_{20}$ alkylcarboxamide. Also disclosed are a process of preparing the insecticidal composition and a method of controlling insects with the insecticidal composition.

11 Claims, 1 Drawing Sheet

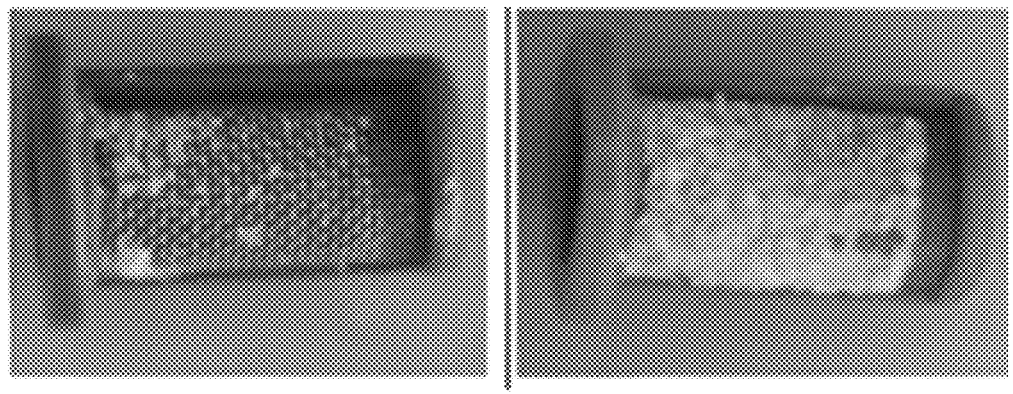
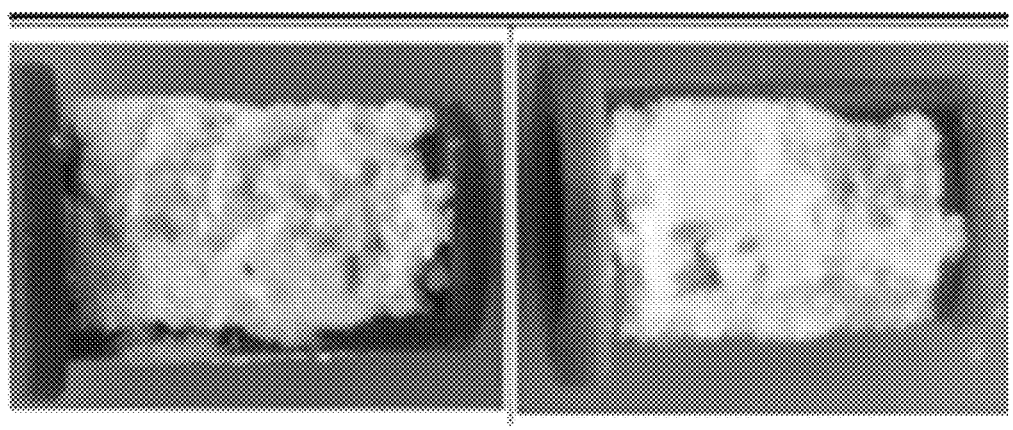
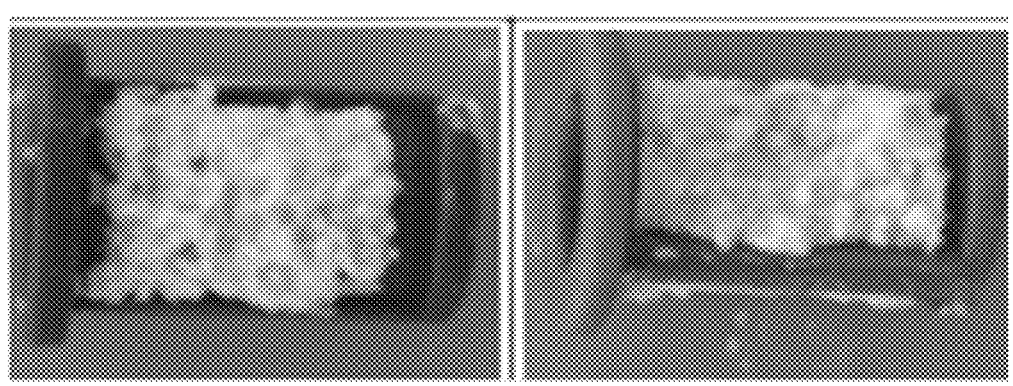

INSECTICIDAL COMPOSITIONS

CROSS-REFERENCE TO RELATED APPLICATIONS

This application claims priority to Brazil Application BR102021017442 filed on Sep. 2, 2021, which is incorporated herein by reference in its entirety.

FIELD OF THE INVENTION

The present disclosure relates to an insecticidal composition, and more particularly, to a stable insecticidal composition including a pyrethroid insecticide. The present disclosure also relates to a process of preparing the insecticidal composition and use thereof.

BACKGROUND

Pest management practice encourages combining more than one agrochemical ingredient. These mixtures show multifaceted advantages than when applied individually. For example, a mixture of two or more agrochemical ingredients can overcome problems related to resistance as well as provide a broader spectrum of control.

To offer improved pest control management, mixtures of pyrethroids with organophosphates are well known. The pyrethroids are non-systemic insecticides with contact and stomach action. They also exhibit anti-feeding action and good residual activity on treated plants. Pyrethroids are used to control a wide range of insects, especially the Lepidoptera, Coleoptera, Deptera and Hemiptera classes. The organophosphates show excellent efficacy for controlling harmful insects, mites and nematodes. They are highly active, relatively safe and inexpensive, and provide an economic means of controlling insect pests.

Acephate (an organophosphate) is a systemic and contact insecticide of moderate persistence with residual activity lasting about 10 to 15 days. Acephate, being highly prone to moisture, is not stable in conventional pesticidal formulations, and undergoes vigorous decomposition in conventional formulations depending on storage conditions. As a result, the insecticidal activity of acephate sometimes cannot be fully realized. When a low melting temperature ingredient like bifenthrin (a pyrethroid) is combined in a pre-mix with a moisture sensitive ingredient like acephate, formulating is a challenge as the moisture sensitive ingredient cannot be granulated using water. Moreover, an increase in temperature during extrusion granulation may melt the low melting temperature active. Once the granules are extruded and stored under ambient condition, the low melting active becomes solid again. This solid-liquid-solid phase change can result in an altered morphology, leading to a change in crystal form, can result in a layering of the ingredients on the surface of the granules, or can result in the granules becoming hard. Consequently, application of the granular composition in fields by way of dilution/tank mixing can provide unsatisfactory yields due to non-uniform dissolution/dispersion of the granular composition with a lack of homogeneity in the resulting mixture, which prevents distribution of constant concentration of the desired active in the fields. Further, the change in the granules also causes nozzle choking due to agglomeration or sedimentation of actives or excipients, which causes technical difficulties in providing effective dose of the composition.

WO2015142609 discloses microparticles including water soluble organothiophosphates (e.g., acephate) and pyrethroids (e.g., bifenthrin). An odor control solution is provided by adding odor-absorbing and odor-masking components.

US20090208423 discloses a synergistic insecticidal composition including imidacloprid, lambda-cyhalothrin, and a conventional agriculturally acceptable carrier or excipient, formulated as an aqueous formulation or dry-based formulations. A process of mixing the actives and the excipients to obtain a homogenous mixture of all ingredients, which is micronized and granulated to yield the granular formulation, is described. Micronizing the inert fillers in which a liquid active is absorbed can pose several problems since the liquid naturally tends to come out of the formulation during fine grinding. The compositions obtained by this method do not generally exhibit good dispersibility and shelf life since the low melting temperature actives undergoes a phase change during the ambient storage conditions leading to caking and crystal growth.

IN1709/MUM/2010 discloses synergistic insecticidal composition of acephate and bifenthrin. In this composition, bifenthrin dissolved in a solubilizer is sprayed onto the mixture of acephate and formulation auxiliaries to obtain a granular composition. The solubilizer used is selected from alkoxylated vegetable oils and their combinations. However, a high loading of active ingredients results in an undesirable softness of the granules in the presence of such solubilizer.

WO2018215883 discloses an agrochemical composition including: a) at least one low melting temperature active ingredient; b) at least one moisture sensitive active ingredient; and c) an additive; characterised in that said additive has a softening point or melting point lower than the melting point of the low melting temperature active ingredient. The additive is selected from higher molecular weight polyethylene glycols (PEG) such as PEG 6000, PEG 4000, PEG 8000 and the like. However, such additives are not sufficient to formulate compacted granules when high amounts of active ingredients are included in the composition.

Although various efforts have been taken in the past to develop a pesticidal composition containing low melting temperature active ingredients and moisture sensitive active ingredients, there is still a long felt need to develop a stable composition that can aid in formulating high amounts of the active ingredients. Also, there is a need for improving the performance of formulations containing a high load of the actives and overcoming the problems of clogging of nozzles or other applicators during application.

SUMMARY

Described herein is an insecticidal composition comprising a pyrethroid insecticide optionally with at least one another insecticide.

Also described is an insecticidal composition comprising a combination of pyrethroid insecticide and a moisture sensitive insecticide.

Further described is a stable insecticidal composition comprising a pyrethroid insecticide and a moisture sensitive insecticide which forms a spray solution impervious to nozzle clogging.

Described herein is a process of preparing a stable insecticidal composition comprising a pyrethroid insecticide and at least one another insecticide.

Further described is the use of the present compositions for controlling insects and a method of controlling pests using the present insecticide compositions.

The present disclosure provides an insecticidal composition comprising at least one pyrethroid insecticide, and at least one N,N-dialkyl-C8-C20 alkylcarboxamide.

In an aspect the disclosure provides an insecticidal composition comprising:
  i. at least one pyrethroid insecticide,
  ii. at least one another insecticide, and
  iii. at least one N,N-dialkyl-$C_8$-$C_{20}$ alkylcarboxamide.

In another aspect the disclosure provides an insecticidal composition comprising:
  i. at least one pyrethroid insecticide,
  ii. at least one organophosphorus insecticide, and
  iii. at least one N,N-dialkyl-$C_8$-$C_{20}$ alkylcarboxamide, wherein said N,N-dialkyl-$C_8$-$C_{20}$ alkylcarboxamide is a granulation aid.

In another aspect the present disclosure provides a stable insecticidal composition comprising:
  i. at least one pyrethroid insecticide,
  ii. at least one organophosphorus insecticide, and
  iii. at least one N,N-dialkyl-$C_8$-$C_{20}$ alkylcarboxamide wherein said N,N-dialkyl-$C_8$-$C_{20}$ alkylcarboxamide is a granulation aid.

In yet another aspect, the disclosure provides a process of preparing an insecticidal composition comprising at least one pyrethroid insecticide, and at least one N,N-dialkyl-C8-C20 alkylcarboxamide; said process comprising mixing the at least one pyrethroid insecticide with a N,N-dialkyl-C8-C20 alkylcarboxamide granulation aid.

In yet another aspect, the disclosure provides a process of preparing an insecticidal composition comprising at least one pyrethroid insecticide, at least one organophosphorus insecticide, and at least one N,N-dialkyl-C8-C20 alkylcarboxamide; said process comprising:
  preparing a blend of the at least one pyrethroid insecticide with the at least one N,N-dialkyl-$C_8$-$C_{20}$ alkylcarboxamide; and optionally adding other excipients;
  separately, preparing a mixture of the at least one organophosphorus insecticide with formulation excipients;
  admixing the blend with the mixture; and
  formulating the admixture to a suitable form using suitable equipment.

In another aspect, a process of preparing a stable insecticidal composition comprising at least one pyrethroid insecticide, at least one organophosphorus insecticide and at least one N,N-dialkyl-$C_8$-$C_{20}$ alkylcarboxamide comprises:
  preparing a blend of the at least one pyrethroid insecticide with the at least one N,N-dialkyl-$C_8$-$C_{20}$ alkylcarboxamide and a dispersing agent;
  separately, preparing a mixture of the at least one organophosphorus insecticide with formulation excipients;
  admixing the blend with the mixture; and
  formulating the admixture to a suitable form using a suitable equipment.

In another aspect, the disclosure provides a method of controlling insects, said method comprising applying to a plant, a part of a plant, or soil in which the plant grows, an effective amount of a composition according to the present disclosure.

In another aspect, the disclosure provides a method of controlling insects, said method comprising applying to a plant, a part of a plant, or soil in which the plant grows, an effective amount of a composition comprising at least one pyrethroid insecticide; at least one organophosphorus insecticide, and at least one N,N-dialkyl-C8-C20 alkylcarboxamide.

In yet another aspect the disclosure provides use of said insecticidal composition to control pests, particularly insects.

Additional features and advantages of the present invention will be apparent from the detailed description that follows, which illustrates by way of example, the most preferred features of the present invention which are not to be construed as limiting the scope of the invention described herein.

BRIEF DESCRIPTION OF THE DRAWINGS

FIGS. 1A-1C pictorially illustrate retention of residues on a nozzle filter during spray applications of various insecticide compositions, wherein FIG. 1A corresponds to the insecticidal composition of Example 4, FIG. 1B corresponds to the insecticidal composition of Example 5, and FIG. 1C corresponds to the insecticidal composition of Example 6.

DETAILED DESCRIPTION

The present disclosure is generally directed to insecticidal compositions including pyrethroids (especially low melting temperature pyrethroids) with a granulation aid including an N,N-dialkyl-$C_8$-$C_{20}$ alkylcarboxamide. It has been surprisingly found that mixing the pyrethroid insecticide with the granulation aid including an N,N-dialkyl-$C_8$-$C_{20}$ alkylcarboxamide prevents the pyrethroids including low melting temperature pyrethroids from undergoing crystal modifications and/or from forming a crust on the granules. The granular formulation thus formed exhibited good suspensibility and dispersibility. It was indeed surprising that the granulation aid of the present disclosure formed stable spray solutions when diluted with water during application. Such spray solutions remained free of any solid crystals/particles/sediments of the active ingredients, which typically causes nozzle clogging and ultimately damages the applicators or results into non-uniform application of the composition.

In one or more embodiments of the present disclosure, the compositions may further include at least another insecticide.

It was found that an insecticidal composition of pyrethroid insecticides (especially low melting temperature active ingredients) with a high loading of another insecticide can be prepared by first mixing the pyrethroid insecticide with the granulation aid including at least one N,N-dialkyl-C8-C20 alkylcarboxamide; and then combining the additional insecticide in the composition.

As used herein, the term 'granulation aid' refers to a component providing cohesion to the mixture of active ingredients to formulate a granular composition. The terms "granulation aid" and "N,N-dialkyl-C8-C20 alkylcarboxamide" are interchangeably used in the aspects and embodiments described herein.

As used herein the term "composition" is used interchangeably with the term "formulation" and are intended to refer to stable solid granules intended to prevent the damage of agricultural crops and its produce from insects and pests.

As used herein the term "highly loaded" is used interchangeably with the term "high loading" or "high load" and is intended to refer to a second insecticide in addition to the at least one pyrethroid insecticide, which is present in a relatively higher amount, i.e., more than 80% w/w in the composition when combined with a pyrethroid insecticide.

As used herein, the term "low melting temperature" is a term recognized in the relevant art, particularly in the field of pesticidal compositions and refers to a compound that has a melting point less than 100° C., less than 90° C. in other embodiments, and from about 40° C. to about 70° C. in still other embodiments of the present disclosure.

The term "'moisture sensitive insecticide" refers to a compound having an ability to absorb moisture and undergoes degradation or other changes in its physico-chemical parameters in the presence of moisture.

As used herein, the term "degradation" denotes activity loss of the active ingredient as a result of exposure to moisture/or upon storage.

The term "locus" as used herein refers to a place to which a composition according to the present disclosure is applied. The term locus includes application to an individual plant, a group of plants such as a plant and/or its surrounding, and the region in which plants may be planted, as well application directly to an insect or insects and/or the vicinity in which they are located.

The term "pesticide: in the context of the present disclosure refers to any agent used to destroy insects, arachnids, fungi, unwanted vegetation, rodents, and/or other pests.

The term "insects" includes all organisms in the class "Insecta." "Insecticidal" refers to the ability of a substance to increase mortality or inhibit, growth rate of insects.

The term "plants" refers to all physical parts of a plant, including seeds, seedlings, saplings, roots, tubers, stems, stalks, foliage and fruits.

The term "agrochemically effective amount of active" refers to an amount of an active that kills or inhibits plant disease for which control is desired in an amount not significantly toxic to the plant being treated.

The terms to "control" or "controlling" insects means to inhibit, through a toxic effect, the ability of insect pests to survive, grow, feed, and/or reproduce, or to limit insect-related damage or loss in crop plants. To "control" the insects may or may not mean killing the insects, although it preferably means killing the insects.

Without wishing to be bound by theory, the inventors in the present disclosure have surprisingly found that use of a granulation aid comprising at least one N,N-dialkyl-C8-C20 alkylcarboxamide in the present composition allows the pyrethroid insecticide to be formulated into a stable composition.

In one or more embodiments, a high loading of a moisture sensitive additional insecticide may be included within the composition of the pyrethroid insecticide and the granulation aid. Importantly, the high loading moisture sensitive insecticide can be contacted with the mixture including the pyrethroid insecticide and the granulation aid.

Further, it has been found that stable compositions can be obtained in the absence of water when the granulation aid includes at least one N,N-dialkyl-C8-C20 alkylcarboxamide, which facilitates granule formation. Thus, the present disclosure provides insecticide compositions including at least one pyrethroid that can avoid the use of water altogether.

Therefore, according to an embodiment of the present disclosure, there is provided an insecticidal composition including at least one pyrethroid insecticide, and an N,N-dialkyl-C8-C20 alkylcarboxamide granulation aid.

According to another embodiment of the present disclosure, there is provided a stable insecticidal composition including:
 i. at least one pyrethroid insecticide,
 ii. at least another insecticide, and
 iii. an N,N-dialkyl-$C_8$-$C_{20}$ granulation aid.

According to an embodiment of the present disclosure, the pyrethroid insecticide can be, but is not intended to be limited to, cypermethrin, permethrin, alphacypermethrin, betacypermethrin, zetacypermethrin, deltamethrin, cyfluthrin, bifenthrin, lambda-cyhalothrin, bioresmethrin, or mixtures thereof.

According to another embodiment of the present disclosure, the pyrethroid insecticide can be bifenthrin, cypermethrin, alpha-cypermethrin, beta-cypermethrin, or zeta-cypermethrin.

In still another embodiment, the pyrethroid insecticide is cypermethrin.

In other embodiments, the pyrethroid insecticide is bifenthrin.

According to an embodiment of the present disclosure, the stable insecticidal composition includes from about 0.01% to about 30% w/w of the pyrethroid insecticide based on the total weight of the agrochemical composition. In another embodiment, the stable insecticidal composition includes from about 0.1% to about 20% w/w of the pyrethroid insecticide based on the total weight of the agrochemical composition; and in still another embodiment, the stable insecticidal composition includes from about 1% to about 10% w/w of the pyrethroid insecticide based on the total weight of the agrochemical composition.

In one or more embodiments of the present disclosure, an insecticidal composition includes bifenthrin, and an N,N-dialkyl-C8-C20 alkylcarboxamide granulation aid.

In another embodiment of the present disclosure, the insecticidal composition includes:
 i. bifenthrin,
 ii. at least one additional insecticide; and
 iii. an N,N-dialkyl-$C_8$-$C_{20}$ alkylcarboxamide granulation aid.

The at least one additional insecticide present in the insecticidal composition can be moisture sensitive, which can deteriorate in the presence of moisture/water.

In one embodiment, the at least one additional insecticide is selected from the organophosphorous class of insecticides, which can include acephate, azinphos-Methyl, carbofuran, chlorpyrifos, coumaphos, crufomate, dimethoate, ethoprop, famphur, fenamiphos, isofenfos, methamidophos, methidathion, methyl parathion, mevinphos, monocrotophos, metam sodium, phosalone, phosmet, phosphamidon, profenofos, TEPP, terbufos, tetrachlorvinphos, trichlorfon, and combinations thereof.

In one embodiment, the organophosphorous insecticide comprises acephate, triazophos, profenofos, chlorpyrifos-methyl, monocrotofos, methamidophos, or a combination thereof.

In one embodiment of the present disclosure, an insecticidal composition includes:
 i. at least one pyrethroid insecticide,
 ii. at least one organophosphorus insecticide and
 iii. at least one N,N-dialkyl-$C_8$-$C_{20}$ alkylcarboxamide, said N,N-dialkyl-$C_8$-$C_{20}$ alkylcarboxamide is a granulation aid.

According to another embodiment of the present disclosure, the insecticidal composition includes:
 i. at least one pyrethroid insecticide,
 ii. at least one organophosphorus insecticide in an amount greater than 80% w/w; and
 iii. at least one N,N-dialkyl-$C_8$-$C_{20}$ alkylcarboxamide, wherein said N,N-dialkyl-$C_8$-$C_{20}$ alkylcarboxamide is a granulation aid.

According to another embodiment of the present disclosure, the organophosphorus insecticide in the stable insecticidal composition is present in an amount greater than 82% w/w.

According to still another embodiment of the present disclosure, the organophosphorus insecticide in the stable insecticidal composition is present in an amount greater than 85% w/w.

According to an embodiment of the present disclosure, the preferred at least one additional insecticide is acephate.

According to an embodiment of the present disclosure, the insecticidal composition includes from about 80% w/w to about 99% w/w of the organophosphorus insecticide based on the total weight of the insecticidal composition.

According to an embodiment of the present disclosure, an insecticidal composition includes:
 i. at least one pyrethroid insecticide;
 ii. acephate; and
 iii. an N,N-dialkyl-$C_8$-$C_{20}$ granulation aid.

According to an embodiment of the present disclosure, an insecticidal composition includes:
 i. bifenthrin,
 ii. acephate; and
 iii. an N,N-dialkyl-$C_8$-$C_{20}$ alkylcarboxamide granulation aid.

According to an embodiment of the present disclosure, the insecticidal composition includes a granulation aid.

According to an embodiment of the present disclosure, the granulation aid used in insecticidal composition is at least one N,N-dialkyl-C8-C20 alkylcarboxamide.

According to an embodiment of the present disclosure, the granulation aid can be N,N-dimethylformamide, N,N-dimethylacetamide, N,N-dimethylbenzamide, N,N-dimethyloctanamide, N,N-dimethyldecanamide, N,N-dimethyldec-9-en-1-amide, N,N-dimethyldodedecanamide, N,N-dimethylactamide, N,N-decylmethylformamide, N,N-dimethyloctanamide(N,N-dimethylcaprylamide), N,N-dimethyl-decanamide(N,N-dimethylcapramide), or mixtures thereof.

According to one embodiment of the present disclosure, the granulation aid includes N,N-dimethyloctanamide and N,N-dimethyldecanamide.

According to an embodiment of the present disclosure, the insecticidal composition includes from about 0.1% to about 50% w/w N,N-dialkyl-C8-C20 alkylcarboxamide based on the total weight of the composition.

According to an embodiment of the present disclosure, the insecticidal composition includes from about 0.5% to about 30% w/w N,N-dialkyl-C8-C20 alkylcarboxamide based on the total weight of the composition.

In one embodiment of the present disclosure, the insecticidal composition includes from about 1% to about 25% w/w N,N-dialkyl-C8-C20 alkylcarboxamide based on the total weight of the composition.

According to another embodiment of the present disclosure, the insecticidal composition includes from about 1% to about 50% w/w granulation aid based on the total weight of the composition.

The stable insecticidal compositions according to the various embodiments of the present disclosure may further include one or more agrochemically acceptable additives or extenders that can be selected from dispersants, wetting agents, fillers, surfactants, anticaking agents, pH-regulating agents, preservatives, biocides, antifoaming agents, colorants, and other formulation aids.

Exemplary dispersants may be selected from ionic and nonionic dispersants to enable disintegration of granules in water with ease, such as salts of polystyrene sulphonic acids, salts of polyvinylsulphonic acids, salts of naphthalenesulphonic acid/formaldehyde condensates, salts of condensates of naphthalenesulphonic acid, phenolsulphonic acid and formaldehyde, and salts of lignosulphonic acid, polyethylene oxide/polypropylene oxide block copolymers, sulphonic acid derivatives such as dodecylbenzene sulphonate, mixture of linear dodecylbenzenesulphonic acid, calcium salt and isobutyl alcohol, polyethylene glycol ethers of linear alcohols, reaction products of fatty acids with ethylene oxide and/or propylene oxide, furthermore polyvinyl alcohol, polyvinylpyrrolidone, copolymers of polyvinyl alcohol and polyvinylpyrrolidone and copolymers of (meth)acrylic acid and (meth)acrylic esters, furthermore alkyl ethoxylates and alkylarylethoxylates ethoxylated alkylarylphosphated and sulphated ester such as tristrylphenol ethoxylate; polycarboxylates, such as sodium polycarboxylate, The preferred dispersing agents include derivative of ethoxylates of vegetable oil or a mixture of one or more of these; or styrene acrylic polymers or mixtures thereof.

Exemplary wetting agents may be selected from soaps; salts of aliphatic monoesters of sulphuric acid including but not limited to sodium lauryl sulphate; sulfoakylamides and salts thereof including but not limited to N-methyl-N-oleoyl-taurate Na salt; akylarylsulfonates including but not limited to akylbenzenesulfonates; akylnaphthalenesulfonates and salts thereof and salts of ligninsulfonic acid.

In an embodiment, the fillers, when present, may be selected from insoluble fillers and soluble fillers.

By way of example, the fillers may be selected from precipitated silica and diatomaceous earth kaolin, dibasic ammonium phosphate.

In an embodiment, the binders, when present, may be selected from polyvinylpyrrolidone, lactose, sucrose and the like.

According to an embodiment of the present disclosure, a solid insecticidal composition includes a pyrethroid insecticide, an organophosphorus insecticide, and a granulation aid selected from N,N-dialkyl-C8-C20 alkylcarboxamide or mixture thereof.

According to an embodiment of the present disclosure, a solid insecticidal composition includes bifenthrin, acephate, and an N,N-dialkyl-C8-C20 alkylcarboxamide granulation aid The solid insecticidal compositions according to the present disclosure can be formulated as water dispersible granules (WDG).

In one embodiment, suitable antifoams may include silicones, long-chain alcohols and salts of fatty acids.

Exemplary colorants (for example in red, blue and green) can include pigments, which are sparingly soluble in water, and dyes, which are water-soluble. Examples include inorganic coloring agents (for example iron oxide, titanium oxide, and iron hexacyanoferrate) and organic coloring agents (for example alizarin, azo and phthalocyanin coloring agents).

According to an embodiment of the present disclosure, the insecticidal composition includes from about 0.1% to about 30% w/w of the pyrethroid insecticide, and from about 0.1% to about 50% of the at least one N,N-dialkyl-C8-C20 alkylcarboxamide based on the total weight of the insecticidal composition.

According to another embodiment of the present disclosure, the insecticidal composition includes from about 0.1% to about 30% w/w of the pyrethroid insecticide, from about 80% to about 99% w/w of the organophosphorus insecticide and from about 0.1% to about 50% of the at least one N,N-dialkyl-C8-C20 alkylcarboxamide based on the total weight of the insecticidal composition.

According to another embodiment of the present disclosure, the insecticidal composition includes from about 0.2% to about 20% w/w of the pyrethroid insecticide, and from about 0.5% to about 30% of the at least one N,N-dialkyl-C8-C20 alkylcarboxamide based on the total weight of the insecticidal composition.

According to another embodiment of the present disclosure, the insecticidal composition includes from about 0.2% to about 20% w/w of the pyrethroid insecticide, from about 80% to about 99% w/w of the organophosphorus insecticide and from about 0.5% to about 30% of the at least one N,N-dialkyl-C8-C20 alkylcarboxamide based on the total weight of the insecticidal composition.

According to another embodiment of the present disclosure, the insecticidal composition includes from about 1% to about 10% w/w of the pyrethroid insecticide, and from about 1% to about 25% of the at least one N,N-dialkyl-C8-C20 alkylcarboxamide based on the total weight of the insecticidal composition.

According to another embodiment of the present disclosure, the insecticidal composition includes from about 1% to about 10% w/w of the pyrethroid insecticide, from about 80% to about 95% w/w of the organophosphorus insecticide and from about 1% to about 25% of the at least one N,N-dialkyl-C8-C20 alkylcarboxamide based on the total weight of the insecticidal composition.

According to another embodiment of the present disclosure, the insecticidal composition includes:
a) 0.1% w/w to 30% w/w bifenthrin,
b) 80% w/w to 99% w/w acephate, and
c) 0.1% w/w to 50% w/w of a mixture of N,N-dimethyloctanamide and N,N-dimethyldecanamide.

According to another embodiment of the present disclosure, the insecticidal composition includes:
a) 1% w/w to 20% w/w bifenthrin,
b) 80% w/w to 99% w/w acephate, and
c) 1% w/w to 50% w/w of a mixture of N,N-dimethyloctanamide and N,N-dimethyldecanamide.

According to another embodiment of the present disclosure, the insecticidal composition includes:
a) 1% w/w to 10% w/w bifenthrin,
b) 80% w/w to 99% w/w acephate, and
c) 1% w/w to 25% w/w of a mixture of N,N-dimethyloctanamide and N,N-dimethyldecanamide.

In specific aspects, the N,N-dimethyloctanamide and N,N-dimethyldecanamide are present in a ratio of 1:10 to 10:1, such as a 50:50 mixture.

According to another embodiment of the present disclosure, a process of preparing an insecticidal composition comprising at least one pyrethroid insecticide, and an N,N-dialkyl-$C_8$-$C_{20}$ alkylcarboxamide granulation aid comprises preparing a blend of the at least one pyrethroid insecticide with the granulation aid, and optionally adding other excipients.

According to another embodiment of the present disclosure, a process of preparing the insecticidal compositions including the at least one pyrethroid insecticide, the at least one additional insecticide, and the at least one N,N-dialkyl-$C_8$-$C_{20}$ alkylcarboxamide granulation aid; includes:
preparing blend of the at least one pyrethroid insecticide with the granulation aid, and optionally adding other excipients;
separately, preparing mixture of the at least one additional insecticide with formulation excipients;
admixing the blend with the mixture to form an admixture; and
formulating the admixture to a desired form using suitable equipment.

According to another embodiment of the present disclosure, a process of preparing an insecticidal composition comprising the at least one pyrethroid insecticide, the at least one another insecticide, and the at least one N,N-dialkyl-$C_8$-$C_{20}$ alkylcarboxamide granulation aid; includes:
preparing blend of the at least one pyrethroid insecticide with the granulation aid and a dispersing agent;
separately, preparing mixture of the at least one additional insecticide with formulation excipients;
admixing the blend with the mixture to form an admixture; and
formulating the admixture to a desired form using suitable equipment.

According to an embodiment of the present disclosure, the blend is obtained by mixing the pyrethroid insecticide with the at least one N,N-dialkyl-$C_8$-$C_{20}$ in the form of an emulsion.

According to another embodiment of the present disclosure, the blend is obtained by mixing the pyrethroid insecticide with the N,N-dialkyl-C8-C20 alkylcarboxamide under the influence of mechanical pressure such as stirring, homogenizing, tilting or shaking.

According to another embodiment of the present disclosure, the blend is obtained by mixing the pyrethroid insecticide with the N,N-dialkyl-C8-C20 alkylcarboxamide under the influence of heat by melting the pyrethroid insecticide to solubilize the pyrethroid insecticide in the N,N-dialkyl-C8-C20 alkylcarboxamide, and forming an emulsion.

According to an embodiment of the present disclosure, the mixture is obtained by mixing the at least one additional insecticide with formulation excipients.

According to another embodiment of the present disclosure, the mixture is in the form of a solid mixture.

According to an embodiment of the present disclosure, a process of preparing an insecticidal composition including at least one pyrethroid insecticide, and an N,N-dialkyl-C8-C20 alkylcarboxamide granulation aid includes preparing a blend of the pyrethroid insecticide with a mixture of N,N-dimethyloctanamide and N,N-dimethyl-decanamide.

According to another embodiment of the present disclosure, a process of preparing an insecticidal composition including at least one pyrethroid insecticide, at least one additional insecticide, and a granulation aid selected from N,N-dialkyl-$C_8$-$C_{20}$ alkylcarboxamide or mixture thereof includes:
preparing a blend of the at least one pyrethroid insecticide with a mixture of N,N-dimethyloctanamide and N,N-dimethyl-decanamide followed by addition of other excipients;
separately, preparing a mixture of the at least one additional insecticide with other formulation excipients;
admixing the blend with the mixture to form an admixture; and
formulating the admixture to a desired form using suitable equipment.

According to another embodiment of the present disclosure, a process of preparing an insecticidal composition including at least one pyrethroid insecticide, acephate being the at least one additional insecticide, and an N,N-dialkyl-$C_8$-$C_{20}$ alkylcarboxamide granulation aid; includes:
preparing a blend of the pyrethroid insecticide, a mixture of N,N-dimethyloctanamide) and N,N-dimethyl-decanamide, and optionally with other excipients;
separately, preparing a mixture of acephate with formulation excipients;
preparing an admixture by combining the blend with the mixture to form an admixture; and formulating the admixture to a desired form using suitable equipment.

According to another embodiment of the present disclosure, a process of preparing a solid insecticidal composition including bifenthrin, and a granulation aid, includes preparing a blend of the bifenthrin with a mixture of N,N-dimethyloctanamide and N,N-dimethyl-decanamide.

According to another embodiment of the present disclosure, a process of preparing a stable solid composition including bifenthrin, acephate and a granulation aid includes:
preparing a blend of bifenthrin with a granulation aid comprising a mixture of N,N-dimethyloctanamide and N,N-dimethyl-decanamide;
separately, preparing a mixture of acephate with formulation excipients;
preparing an admixture by combining the blend with the mixture; and
formulating water dispersible granules of the admixture to provide a stable insecticidal composition.

According to another embodiment of the present disclosure, a process of preparing a solid insecticidal composition including bifenthrin, acephate and a granulation aid includes:
preparing a blend of bifenthrin with a granulation aid comprising a mixture of N,N-dimethyloctanamide and N,N-dimethyl-decanamide;
separately, preparing a mixture of acephate with formulation excipients;
preparing an admixture by combing the blend with the mixture; and
formulating water dispersible granules as a stable, solid insecticidal composition.

According to an embodiment of the present disclosure, the blend of the bifenthrin with the mixture of N,N-dimethyloctanamide and N,N-dimethyl-decanamide can be obtained using a suitable blender such as ribbon blender, V-blender, high intensity plough shear mixer or the like.

According to an embodiment of the present disclosure, the granulation of water dispersible granules can be done by an extrusion process.

According to an embodiment of the present disclosure, drying the granules may be performed utilizing suitable drying equipment such as, but not limited to, a fluidized bed drier, a tray drier, a rotocone vacuum drier, or the like.

According to an embodiment of the present disclosure, the drying of extruded granules operates at a temperature of not more than 90° C.-100° C.

According to one embodiment of the present disclosure, the drying of extruded granules operates at a temperature range of 50° C.-70° C.

According to an embodiment of the present disclosure, the dried granules are sieved to remove undersized and oversized granules.

According to an embodiment of the present disclosure, the various components in the composition materials can be in a finely divided form, preferably in an air-milled form, which is typically the form of technical grade chemicals supplied by manufacturers.

After thorough mixing or after otherwise putting the mix into a form suitable for extrusion, extrusion takes place through suitable orifices. The size of the granules will generally depend upon the size of the orifices in the extruder. As such, the extruder may be fitted with a mesh or a die selected to provide a desired size of granules. In one embodiment, extrusion orifices will be chosen to provide extrusions between 300 and 3,000 microns in diameter. The granules obtained by extrusion can vary considerably in length, e.g., up to 0.5 cm or more long.

In an embodiment of the present disclosure, pH of the stable solid insecticidal composition is adjusted between 5 to 8.

The process of the disclosure advantageously can be configured to considerably reduce the amount of oversized and undersized granules, which are typically recycled. Consequently, the granular composition is essentially dust free.

According to an embodiment, the process of the present disclosure may include additional conventional steps known to a person skilled in the art, which may be necessary but not crucial to achieve the advantages of the present disclosure.

The composition of the present disclosure enjoys all the advantages discussed above, making it beneficial from an economic aspect and a handling aspect, and provides a very good performance during application. As will be demonstrated in the examples below, the compositions of the present disclosure advantageously demonstrate good suspensibility, stability, dispersibility, free flowability and passes the wet sieve test.

According to an embodiment, the present disclosure provides an insecticidal composition including at least one pyrethroid insecticide, and an N,N-dialkyl-C8-C20 alkylcarboxamide granulation aid, as a pesticide.

According to another embodiment, the present disclosure provides a stable insecticidal composition including at least one pyrethroid insecticide, at least another insecticide, and an N,N-dialkyl-C8-C20 alkylcarboxamide granulation aid, as a pesticide.

Accordingly, the stable insecticidal compositions of the present disclosure provide a quick knockdown kill of pests. It is an especially potent lethal weapon to kill especially Lepidoptera, Coleoptra, Diptera, Hemiptera, and is effective against crop insects like leps, stink bugs and plant bugs.

In one embodiment, the crops on which the insecticidal compositions of the present disclosure may be used include, but are not intended to be limited to, cereals, such as wheat, oats, barley, spelt, triticale, rye, maize, millet, rice, crops such as sugarcane, soybean, sunflower, rape, canola, tobacco, sugar beet, fodder beet; tuber crops such as potatoes, sweet potatoes etc., crops such as asparagus, hops etc.; fruit plants such as apples, pears, stone-fruits such as for example peaches, nectarines, cherries, plums, apricots, citrus fruits such as oranges, grapefruit, limes, lemons, kumquats, mandarins, satsumas; nuts such as pistachios, almonds, walnuts, pecan nuts, tropical fruits such as mango, papaya, pineapple, dates, bananas etc., grapes, vegetables such as endives, lambs, lettuce, fennel, globe and loose-leaf salad, chard, spinach, chicory, cauliflower, broccoli, Chinese cabbage, kale (winter kale or curly kale), kohlrabi, brussel sprouts, red cabbage, white cabbage and savoy, fruiting vegetables such as aubergines, cucumbers, paprika, marrow, tomatoes, courgettes, sweetcorn, root vegetables such as celeriac, turnip, carrots, swedes, radishes, horse radish, beetroot, salsify, celery, pulses such as peas, beans etc., bulb vegetables such as leeks, onions etc., oil crops such as mustard, poppy, olives, sunflowers, coconut, castor oil plants, cocoa beans, groundnuts; fibre crops such as cotton, jute, flex, hemp, crops such as tea, coffee, rubber, and ornamentals including shrubs and flowering plants, vines, range land and pastures.

In an embodiment, insecticidal compositions of the present disclosure may optionally be mixed with other insecticides, attractants, sterilants, bactericides, acaricides, nematicides, fungicides, growth regulators, herbicides, fertilizers and mixtures thereof.

According to an embodiment of the present disclosure, a method of controlling insects includes applying to a locus, an effective amount of the insecticidal composition according to the present disclosure.

In another embodiment, the method of the present disclosure comprises applying the insecticidal compositions in accordance with the present disclosure at the locus of the infestation.

Thus, in an embodiment, the present disclosure provides a method of controlling insect pests at a locus, the method including application at the locus of an insecticidally effective amount of compositions including at least one pyrethroid insecticide, and an N,N-dialkyl-C8-C20 alkylcarboxamide granulation aid.

Thus, in another embodiment, the present disclosure provides a method of controlling insect pests at a locus, the method including application at the locus of an insecticidally effective amount of compositions including at least one pyrethroid insecticide, at least another insecticide and an N,N-dialkyl-C8-C20 alkylcarboxamide granulation aid.

According to another embodiment of the present disclosure, a method of controlling insects includes applying to a plant, a part of a plant, or soil in which the plant grows, an effective amount of a composition including at least one pyrethroid insecticide; at least one organophosphorus insecticide, and an N,N-dialkyl-C8-C20 alkylcarboxamide granulation aid.

According to another embodiment of the present disclosure, a method of controlling insects includes applying to a plant, a part of a plant, or soil in which the plant grows, an effective amount of a composition including bifenthrin, acephate, and a mixture of N,N-dimethyloctanamide and N,N-dimethyldecanamide.

In one embodiment, the present disclosure can provide a method of controlling insect pests such as those belonging to the Lepidopteran, Coleoptran, Dipteran, Hemipteran classes.

In another embodiment of the present disclosure, a multi-pack insecticidal product for controlling insects at a locus includes:
i. a composition containing at least one pyrethroid insecticide, optionally at least one organophosphorus insecticide, and a granulation aid as defined above,
ii. an instruction manual for instructing an end-user for administering the compositions to the locus.

Advantageously, stable compositions can be provided by combination of at least one pyrethroid insecticide, optionally at least one additional insecticide, with an N,N-dialkyl-C8-C20 alkylcarboxamide granulation aid. The optimum concentration of the active ingredients as well as the formulation ingredients that led to the stable solid formulations for example WDG formulation, are exemplified by the following examples.

While foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and the following examples, but by all embodiments and methods described herein within the scope and spirit of the disclosure.

EXAMPLES

The following examples illustrate the basic methodology and versatility of the invention.

Example 1

Acephate 85% W/W+Bifenthrin 3% W/W Water Dispersible Granule (WDG)

| Ingredients | Quantity |
| --- | --- |
| Bifenthrin | 3.2 |
| Acephate | 87.9 |
| N,N-dimethyloctanamide) and N,N-dimethyl-decanamide mixture | 4.0 |
| Dispersing agent | 0.9 |
| Binder | 1.0 |
| Filler | q.s. |
| Total | 100 |

In Example 1, an insecticidal composition was prepared by mixing 3.2 grams (g) bifenthrin with 4.0 g of a N,N-dimethyloctanamide and N,N-dimethyl-decanamide mixture followed by addition of 0.9 g of a dispersing agent under continuous stirring to form a blend. Separately, 87.9 g acephate, 1 g binder and fillers were mixed together and homogenized to obtain a mixture. The blend was transferred to a ribbon blender and under continuous mixing, the mixture was added into the blend to obtain a pre-mix (i.e., admixture). The pre-mix was then subjected to granulation to obtain granules of the insecticidal composition.

Example 2

Acephate 85% W/W+Bifenthrin 3% W/W WDG

| Ingredients | Quantity |
| --- | --- |
| Bifenthrin | 3.1 |
| Acephate | 86 |
| N,N-dimethyloctanamide and N,N-dimethyl-decanamide mixture | 4.8 |
| Dispersing agent | 0.95 |
| Binder | 1.0 |
| Filler | q.s |
| Total | 100 |

In this example, an insecticidal composition was prepared with acephate, bifenthrin, the N,N-dimethyloctanamide and N,N-dimethyl-decanamide mixture, a dispersing agent, a binder, and a filler in the above quantities and WDG were prepared according to the process of Example 1.

Example 3

Acephate 85% W/W+Bifenthrin 3% W/W WDG

| Ingredients | Quantity |
| --- | --- |
| Bifenthrin | 3.18 |
| Acephate | 87.31 |

-continued

| Ingredients | Quantity |
| --- | --- |
| N,N-dimethyloctanamide) and N,N-dimethyl-decanamide mixture | 4.8 |
| Dispersing agent | 1.75 |
| Binder | 1.0 |
| Filler | q.s |
| Total | 100 |

In this example, an insecticidal composition was prepared with acephate, bifenthrin, the N,N-dimethyloctanamide and N,N-dimethyl-decanamide mixture, a dispersing agent, a binder and a filler in the above quantities and WDG were prepared according to the process of Example 1.

Stability Study:

As summarized in Table 1 below, the insecticidal compositions of Examples 1-2 were tested to assess the physicochemical parameters. The WDG compositions of Examples 1-2 appeared to be bright white granules and were found to be quite acceptable as per quality control standards. The pH remained between 5 to 6.5. To assess the spontaneity of a dispersion, a number of inversions were counted, and fully dispersed suspensions were obtained from both the Example 1 and 2 compositions within 10-12 inversions. A good suspensibility above 99% was also observed for both compositions. Wettability of the composition of Examples 1-2 was tested as per the CIPAC (MT 53.1) method and found to be quite acceptable as maximum wetting time was less than 6 seconds. Degradation of both the actives, acephate and bifenthrin were minimal and remained within acceptable limits. The compositions of Examples 1-2 were found to pass the wet sieve test as less than 1% residue was retained on the wet sieve. Suspensibility of actives was calculated separately and both acephate and bifenthrin in the compositions were found to have more than 90% suspensibility.

TABLE 1

|  | Example 1 | | Example 2 | |
| --- | --- | --- | --- | --- |
|  | Ambient | 14 AHS | Ambient | 14 AHS |
| Appearance | Bright white | Bright white | Bright white | Bright white |
| pH | 5.25 | 5.38 | 6.62 | 6.42 |
| No. of inversions | 8-10 | 10-12 | 8-10 | 8-10 |
| Persistence foam 20 ppm (60) | 25 | 30 | 20 | 26 |
| Suspensibility (gravimetric) (20 ppm) | 101.1 | 99.50 | 102.4 | 101.9 |
| Wettability (seconds) | 5-6 | 5-6 | 4-5 | 4-5 |
| Active Content (%) | | | | |
| Acephate | 85.92% | 85.88% | 86.02 | 83.53 |
| Bifenthrin | 3.21% | 3.2% | 2.94 | 2.9 |
| Wet sieve test (% w/w) | 99.2 | 99.41 | 99.93 | 99.88 |
| Retention on 200BSS sieve | 0.8 | 0.56 | 0.07 | 0.12 |
| Active suspensibility | | | | |
| Acephate | 95.87 | 95.10 | 98.18 | 96.43 |
| Bifenthrin | 92.07 | 91.31 | 96.27 | 92.67 |

As summarized in Table 2 below, the composition of Example 3 was assessed for the physicochemical parameters. The WDG appeared to be bright white granules and were found to be acceptable per quality control standards. The pH remained between 5 to 6.5. As for the spontaneity of the dispersion, a fully dispersed suspension was obtained within 10-12 inversions. Additionally, good suspensibility above 99% was observed, and wettability found to be within acceptable limit. Degradation of both the actives, acephate and bifenthrin remained within acceptable limits. The composition of Example 3 was found to pass the wet sieve test as less than 1% residue was retained on the wet sieve. Suspensibility of the actives was calculated separately and both acephate and bifenthrin were found to have more than 90% suspensibility.

TABLE 2

|  | Example 3 | |
| --- | --- | --- |
|  | Ambient | 14 AHS |
| Appearance | Bright white | Bright white |
| pH | 6.61 | 6.47 |
| No. of inversions | 10-12 | 10-12 |
| Persistence foam 20 ppm (60) | 12 | 22 |
| Suspensibility (gravimetric) (20 ppm) | 100.2 | 100 |
| Wettability (seconds) | 4-5 | 4-5 |
| Active content (%) | | |
| Acephate | 87.11 | 85.64 |
| Bifenthrin | 2.99 | 3.00 |
| Wet sieve test (% w/w) | 99.87 | 99.81 |
| Retention on 200BSS sieve | 0.13 | 0.19 |
| Active suspensibility | | |
| Acephate | 99.78 | 96.21 |
| Bifenthrin | 97.03 | 95.01 |

The composition of Example-3 was also subjected to a real time study, wherein the physico-chemical properties were re-assessed after 6 months. Appearance-wise, the composition remained acceptable. The parameters such as pH, number of inversions, and persistence foam remained quite stable. Suspensibility maintained above 98% and wettability was found to be 3 seconds. The active content of acephate and bifenthrin were found to be 84.58 and 2.98, respectively. Suspensibility of the actives was found to be above 90%, therefore providing the desired physico-chemical specification after long term storage of 6 months.

Nozzle Clogging Study:

The nozzle clogging study was conducted to assess the performance of the compositions in the field. The compositions successfully tested as no residue was retained on a 100 mesh nozzle filter. The spray dilution of the compositions easily passed from the nozzle with a normal spray pattern. No residue was found on either the tank filter or on the nozzle filter as summarized in Table 3.

TABLE 3

|  | Observation | | |
| --- | --- | --- | --- |
| Parameters | Example-1 | Example-2 | Example-3 |
| Spray pattern | Normal | Normal | Normal |
| Tank filter | No residue retained | No residue retained | No residue retained |
| Nozzle filter (100 mesh) | No retention | No retention | No retention |

Screening of Granulation Aid Screening

In these examples, the purpose was to identify the most suitable granulation aid for stabilizing the pyrethroid insecticide and aid in formulating a stable composition. In addition, composition performance of the formulation was examined subsequent to dilution for field application. Several solvents were screened as granulation aids with respect to the pyrethroid insecticide. The results are summarized in Tables 4 and 5 below.

The composition of Example 4 was prepared using aromatic hydrocarbon (Solvesso™ 150), which resulted in soft and dusty granules. The granules dispersed easily in ambient testing conditions but in the Agricultural Health Study (AHS) testing, the granules exhibited poor dispersion and were not able to disintegrate.

The composition of Example 5 was prepared using aromatic hydrocarbon (Solvent C-9). The composition resulted into soft and dusty granules. The granules dispersed easily in ambient testing conditions but in AHS testing, granules had poor dispersion and not able to disintegrate.

The composition of Example 6 was prepared using xylene, which failed in the AHS study.

A greater number of inversions was observed in the AHS study for the compositions of Examples 4-6. Foam remained within the limit. Suspensibility drop was observed in AHS study. Further, degradation of actives also found to be remained under controlled. The granules found to have acceptable wettability and wet sieve retention, but active suspensibility greatly dropped in AHS. (Table 4 and Table 5).

TABLE 4

| Ingredients | Example-4 | Example-5 | Example-6 |
|---|---|---|---|
| Acephate | 87.30 | 87.3 | 87.3 |
| Bifenthrin | 3.20 | 3.2 | 3.2 |
| Aromatic hydrocarbon (Solvesso ™ 150) | 4.5 | 0 | 0 |
| Aromatic hydrocarbon (Solvent C-9) | 0 | 4.5 | 0 |
| Xylene | 0 | 0 | 4.5 |
| Dispersing agents | 1.7 | 1.7 | 1.71 |
| Binder | 1.00 | 1 | 1 |
| Filler | 2.3 | 2.3 | 2.29 |

TABLE 5

| | Example-4 | | Example-5 | | Example-6 | |
|---|---|---|---|---|---|---|
| | Ambient | 14 AHS | Ambient | 14 AHS | Ambient | 14 AHS |
| Appearance | Bright white | Bright white | Bright white | Light yellow | Bright white | Light Yellow |
| pH | 6.81 | 6.6 | 6.83 | 6.63 | 6.85 | 6.63 |
| No. of inversions | 8-10 | 30+ | 8-10 | 30+ | 10-12 | 30+ |
| Persistence foam 20 ppm (60) | 12 | 18 | 14 | 8 | 28 | 16 |
| Suspensibility (gravimetric) (20 ppm) | 98.34 | 56.79 | 99.39 | 79.23 | 75.12 | 44.76 |
| Wettability | 4-5 | 4-5 | 4-5 | 4-5 | 4-5 | 4-5 |
| Active content (%) | | | | | | |
| Acephate | 86.61 | 85.62 | 87.88 | 86.2 | 87.8 | 86.23 |
| Bifenthrin | 2.98 | 2.92 | 3.02 | 3.04 | 3.04 | 3.0 |
| Retention on 200BSS sieve | 0.21 | 0.46 | 0.18 | 0.22 | 0.14 | 0.48 |
| Active suspensibility | | | | | | |
| Acephate | 96.55 | 96.80 | 96.81 | 97.02 | 96.73 | 96.28 |
| Bifenthrin | 79.87 | 67.78 | 79.75 | 65.78 | 84.23 | 49.04 |
| Remarks | Soft and dusty granules. At ambient granules dispersed easily. In AHS, poor dispersion and no disintegration. | | Soft and dusty granules. At ambient granules dispersed easily. In AHS, poor dispersion and no disintegration. | | Soft and dusty granules. At ambient granules dispersed easily. In AHS, poor dispersion and no disintegration. | |

Nozzle Clogging Study of Examples 4-6

The compositions of Example-4-6 were also tested for residue retention on 50 mesh as well as 100 mesh nozzle filter. The results are summarized in Table 6 below. In the spray dilution of the composition of Examples 4-6, a significant amount of residues were found to be retained on a 50 mesh filter as well as a 100 mesh filter. Therefore, compositions of Example 4-6 were found to be unfit with respect to field performance.

TABLE 6

SUMMARY OF RESULTS OF RESIDUE RETENTION TEST

| | Observation | | |
|---|---|---|---|
| Parameters | Example-4 | Example-5 | Example-6 |
| Spray pattern | Normal | Normal | Normal |
| Tank filter | No residue retained | No residue retained | No residue retained |
| Nozzle filter retention 50 mesh | 0.01 | 0.74 | 1.76 |

TABLE 6-continued

SUMMARY OF RESULTS OF RESIDUE RETENTION TEST

| Parameters | Observation | | |
|---|---|---|---|
| | Example-4 | Example-5 | Example-6 |
| Nozzle filter retention 100 mesh | 0.16 | 0.76 | 2.05 |

Example 7

Acephate 85% W/W+Lambda-Cyhalothrin 3% W/W WDG

In Example 7, an insecticidal composition was prepared by mixing the following components shown below. Acephate, lambda-cyhalothrin, N,N-dimethyloctanamide and N,N-dimethyl-decanamide mixture, dispersing agent, binder and filler were added in above quantities and WDG were prepared according to the process of Example 1.

| Ingredients | Quantity |
|---|---|
| Acephate | 87.76 |
| Lambda Cyhalothrin | 3.30 |
| N,N-dimethyloctanamide and N,N-dimethyl-decanamide mixture, | 4.80 |
| Dispersing agent | 1.75 |
| Binder | 1.00 |
| Filler | 1.39 |
| Total | 100 |

Example 8

Acephate 85% W/W+Permethrin 3% W/W WDG

In Example 8, an insecticidal composition was prepared by mixing the following components shown below. Acephate, permethrin, N,N-dimethyloctanamide and N,N-dimethyldecanamide mixture, dispersing agent, binder and filler were added in above quantities and WDG were prepared according to the process of Example 1.

| Composition Ingredients | (% w/w) |
|---|---|
| Acephate | 87.76 |
| Permethrin | 3.40 |
| N,N-dimethyloctanamide and N,N-dimethyl-decanamide mixture | 4.80 |
| Dispersing agents | 1.75 |
| Binder | 1.00 |
| Filler | 1.29 |
| Total | 100.00 |

Physico-Chemical Stability of Example 7 and Example 8

Table 7 below summarizes the physico-chemical stability for the compositions prepared in accordance with Examples 7 and 8. As noted above, the composition of Example-7 included the combination of lambda-cyhalothrin and acephate; and the composition of Example-8 included the combination of permethrin and acephate. Both the compositions were found to exhibit quite satisfactory physico-chemical profiles with suspensibility greater than 97% and wettability of the granules of about 5 seconds. Also, the active ingredients (i.e., the combination of acephate and lambda-cyhalothrin and the combination of acephate and permethrin) were found to remain stable. Wet sieve retention was found to be zero indicating that both compositions would not cause nozzle chocking. Therefore, the compositions developed using the granulation aid were found to be stable as well as quite suitable from application point-of-view.

TABLE 7

PHYSICO-CHEMICAL STABILITY FOR THE COMPOSITIONS PREPARED IN ACCORDANCE WITH EXAMPLES 7 AND 8

| Parameters | Example-7 | | Example-8 | |
|---|---|---|---|---|
| | Ambient | AHS | Ambient | AHS |
| Appearance | Complying | Complying | Complying | Complying |
| pH | 6.37 | 4.46 | 6.27 | 4.69 |
| No. of inversions | 6-8 | 8-10 | 6-8 | 8-10 |
| Suspensibility (gravimetric) (20 ppm) | 97.83 | 98.34 | 98.67 | 98.56 |
| Wettability (seconds) | 5.00 | 5.00 | 5.00 | 5.00 |
| Active content (% w/w) | | | | |
| Acephate | 85.54 | 80.68 | 85.54 | 81.04 |
| Lambda Cyhalothrin | 3.17 | 2.98 | — | — |
| Permethrin | — | — | 3.24 | 3.23 |
| Wet sieve test (% w/w) Retention on 200BSS sieve | 0.00 | 0.00 | 0.00 | 0.00 |

Example 9

Efficacy Study

In Example 9, the effectiveness of the composition prepared in accordance with Example 1 was tested to control bed bugs in the Brazil region on several pests on soybean and corn crops.

Efficacy Testing for Control of Brown Stink Bugs in Soybean:

The composition of Example 1 showed consistent control of brown stink bugs on soybean crops at doses of 0.8 to 1.0 kg/ha for both nymphs and adults. At both the doses, more than 75% control of brown stink bugs was observed upon a single application of the composition of Example 1.

| | Soybean Crop % insect control | | |
|---|---|---|---|
| | Nymphs | Adults | Total |
| UTC | 0 | 0 | 0 |
| Example-1 (0.8 kg/ha) | 81 | 75 | 78 |
| Example-1 (1.0 kg/ha) | 85 | 75 | 80 |

UTC means untreated control

Efficacy Testing for Control of Brown Stink Bug in Soybean

Efficiency in controlling brown stink bug in soybean was evaluated by spraying the diluted composition of Example-1 at a dose rate of 0.8 Kg/Ha. The composition was applied three times in 20 days on infected soybean crop. For comparison purpose, a conventional formulation commercially available from the market containing the combination of imidacloprid+bifenthrin was also applied in an adjacent crop at a dose of 0.35 L/Ha. Around 88% control was observed after 3 applications of the composition of Example 1. In contrast, the market sample could control only about 76% brown stink bugs. Therefore, the composition prepared in accordance with the present disclosure was found to be more effective and in better control of the brown stink bugs on soybean crops.

Spray Schedule:
A—First application with 1.0 bed bugs/m
B—second application (10 days after the first)
C—third application (10 days after the second)

| Soybean Crop % insect control | | | |
|---|---|---|---|
| | Nymphs | Adults | Total |
| Example-1 (0.8 kg/ha) | 88 | 88 | 88 |
| Market sample (0.3 L/Ha) | 80 | 67 | 76 |

Advantageously, the insecticidal composition of the present disclosure provides a stable insecticidal composition of pyrethroid insecticide in combination with at least one additional insecticide when utilized with the granulation aid of N,N-dialkyl-$C_8$-$C_{20}$ alkylcarboxamide. The composition was found to be stable in various assessment parameters. Both acephate and pyrethroids remained stable while formulation processing as well as during stability study. It is clear from the experimental data, as described above that the granulation aid comprising N,N-dialkyl-$C_8$-$C_{20}$ alkylcarboxamide or mixture was found to be very effective in controlling the physico-chemical profile of a low melting pyrethroid even at higher temperatures of granulation process. The compositions remained quite stable during transport and shelf life. Nozzle clogging problems were solved with the granulation aid of at least one N,N-dialkyl-$C_8$-$C_{20}$ alkylcarboxamide. As such, the spirit and scope of the disclosure should not be limited to the description of the preferred embodiment contained therein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An insecticidal composition comprising at least one pyrethroid insecticide having a melting point less than 100° C., wherein said pyrethroid is in an amount from 0.1% w/w to less than 20% w/w of a total weight of the insecticide composition, wherein the at least one pyrethroid insecticide comprises cypermethrin, permethrin, alpha-cypermethrin, beta-cypermethrin, zeta-cypermethrin, deltamethrin, cyfluthrin, bifenthrin, lambda-cyhalothrin, bioresmethrin, or a mixture thereof,
    acephate from 80% w/w to 99% w/w of the total weight of the insecticide composition, and
    at least one N,N-dialkyl-$C_8$-$C_{20}$ alkylcarboxamide in an amount from 0.1% w/w to less than 20% w/w of the total weight of the insecticide composition.

2. The insecticidal composition as claim in claim 1, wherein the at least one N, N-dialkyl-$C_8$-$C_{20}$ alkylcarboxamide is a granulation aid comprising N,N-dimethyloctanamide, N,N-dimethyldecanamide, N,N-dimethyldodecanamide, or a mixture thereof.

3. The insecticidal composition as claimed in claim 1, wherein the at least one N,N-dialkyl-$C_8$-$C_{20}$ alkylcarboxamide is a mixture of N,N-dimethyloctanamide and N,N-dimethyldecanamide.

4. The insecticidal composition as claimed in claim 1, wherein the at least one N,N-dialkyl-$C_8$-$C_{20}$ alkylcarboxamide comprises about 1% w/w to less than 20% w/w of the total weight of the insecticide composition.

5. The insecticidal composition as claimed in claim 1, wherein the at least one pyrethroid insecticide is bifenthrin, and wherein the at least one N,N-dialkyl-$C_8$-$C_{20}$ alkylcarboxamide is a mixture of N,N-dimethyloctanamide and N,N-dimethyldecanamide.

6. The insecticidal composition as claimed in claim 1, wherein said insecticidal composition comprises water dispersible granules (WDG).

7. A process of preparing the insecticidal composition of claim 1, the process comprising:
    preparing a blend of the at least one pyrethroid insecticide with the at least one N,N-dialkyl-$C_8$-$C_{20}$ alkylcarboxamide;
    separately, preparing a mixture of acephate with formulation excipients;
    admixing the blend with the mixture to form an admixture; and
    formulating the admixture to obtain said insecticidal composition.

8. The process as claimed in claim 7, wherein the insecticidal composition comprises water dispersible granules.

9. The process as claimed in claim 7, wherein formulating the admixture comprises extrusion.

10. A method of controlling insects, said method comprising applying to a plant, a part of a plant, or soil in which the plant grows, an effective amount of the composition of claim 1.

11. The method as claimed in claim 10, wherein the at least one pyrethroid insecticide is bifenthrin and the at least one N,N-dialkyl-$C_8$-$C_{20}$ alkylcarboxamide is a mixture of N,N-dimethyloctanamide and N,N-dimethyldecanamide.

* * * * *